(12) United States Patent
Miebach

(10) Patent No.: US 7,988,389 B2
(45) Date of Patent: Aug. 2, 2011

(54) TWIST DRILL

(75) Inventor: Jurgen Miebach, Lindlar (DE)

(73) Assignee: Horst Miebach GmbH, Lindlar (DE)

( * ) Notice: Subject to any disclaimer, the term of this patent is extended or adjusted under 35 U.S.C. 154(b) by 1094 days.

(21) Appl. No.: 11/569,619

(22) PCT Filed: May 25, 2005

(86) PCT No.: PCT/DE2005/000964
§ 371 (c)(1),
(2), (4) Date: Nov. 27, 2006

(87) PCT Pub. No.: WO2005/115668
PCT Pub. Date: Dec. 8, 2005

(65) Prior Publication Data
US 2007/0253788 A1    Nov. 1, 2007

(30) Foreign Application Priority Data
May 27, 2004    (DE) .......................... 10 2004 026 014

(51) Int. Cl.
*B23B 51/02* (2006.01)
(52) U.S. Cl. .......................... 408/211; 408/225; 408/230
(58) Field of Classification Search ................. 408/211, 408/223–225, 227, 230; *B23B 51/00, 51/02*
See application file for complete search history.

(56) References Cited

U.S. PATENT DOCUMENTS

| | | | |
|---|---|---|---|
| 1,221,247 A * | 4/1917 | Traylor ........................ 408/224 |
| 2,600,286 A * | 6/1952 | Weiland ........................ 408/211 |
| 2,652,083 A * | 9/1953 | Emmons ....................... 408/211 |
| 4,529,341 A | 7/1985 | Greene |

(Continued)

FOREIGN PATENT DOCUMENTS

EP        0137898        4/1985

(Continued)

OTHER PUBLICATIONS

International Search Report dated Oct. 6, 2005, received in corresponding international application No. PCT/DE05/000964, 2 pgs.

(Continued)

*Primary Examiner* — Daniel W Howell
(74) *Attorney, Agent, or Firm* — Grossman Tucker Perreault & Pfleger, PLLC

(57) ABSTRACT

The invention relates to a twist drill, with an elongated drill body displaying a connecting end, a middle part, and a working end with a center point, in addition to at least two main cutting edges that run roughly transversely to the longitudinal axis of the drill body and lie opposite one another in relation to the longitudinal axis, where main cutting edges are each provided with a radially outer tip, which projects in feed direction x of twist drill, a helical chip removal flute follows on from each main cutting edge, center point displays at least two pilot cutting edges, and pilot cutting edges start from the free end of center point, run roughly transversely to the longitudinal axis of drill body and lie opposite one another in relation to the longitudinal axis. In order to achieve a drill hole with flawless, clean edges, pilot cutting edges are each be provided with a radially outer tip projecting in the feed direction of the twist drill, and a pilot chip removal flute follows on from each pilot cutting edge, transitioning into chip removal flute.

14 Claims, 1 Drawing Sheet

U.S. PATENT DOCUMENTS

| | | | | |
|---|---|---|---|---|
| 4,645,389 A | * | 2/1987 | Maier | 408/230 |
| 5,056,967 A | * | 10/1991 | Hageman | 408/230 |
| 5,149,234 A | * | 9/1992 | Durfee, Jr. | 408/211 |
| 5,288,183 A | | 2/1994 | Chaconas et al. | |
| 5,980,169 A | * | 11/1999 | Hinch | 408/225 |
| 6,190,097 B1 | * | 2/2001 | Thomas | 408/230 |
| 6,857,832 B2 | * | 2/2005 | Nygård | 408/211 |
| 7,267,514 B2 | * | 9/2007 | Wetzl et al. | 408/225 |
| 2005/0053439 A1 | * | 3/2005 | Wang et al. | 408/230 |

FOREIGN PATENT DOCUMENTS

| | | | | |
|---|---|---|---|---|
| FR | 2747950 | A1 | * | 10/1997 |
| JP | 2237709 | | | 9/1990 |
| JP | 02237711 | A | * | 9/1990 |
| JP | 02237712 | A | * | 9/1990 |
| JP | 03117507 | A | * | 5/1991 |
| JP | 06031517 | A | * | 2/1994 |
| JP | 07164225 | A | * | 6/1995 |
| SU | 1238905 | A1 | * | 6/1986 |

OTHER PUBLICATIONS

Translation of the International Preliminary Report on Patentability dated Feb. 8, 2007, received in corresponding international application No. PCT/DE05/000964, 6 pgs.

* cited by examiner

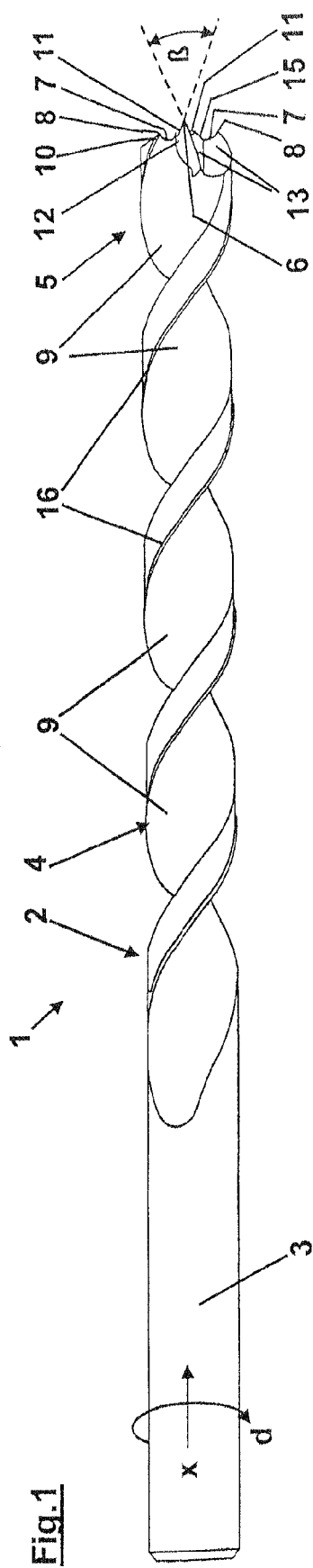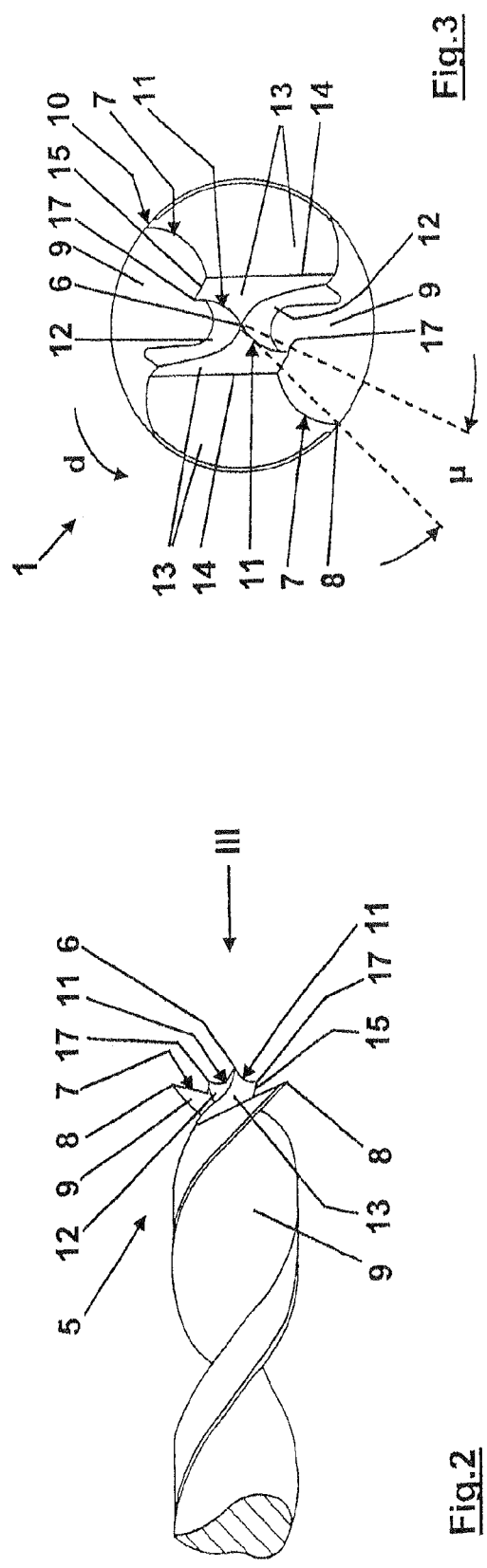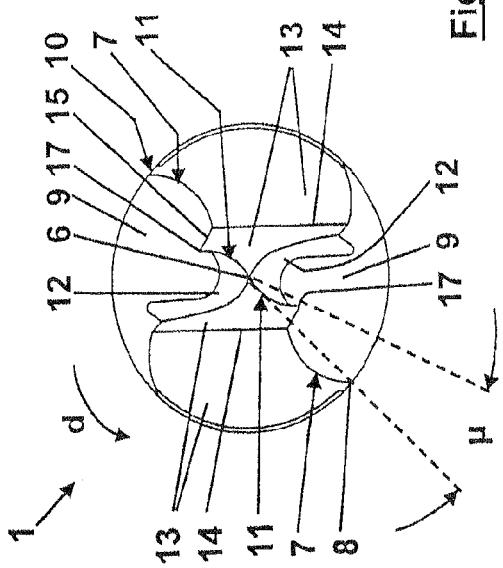

TWIST DRILL

The invention relates to a twist drill, particularly for soft materials, such as wood, plastic, soft metals, composite materials and similar, with an elongated drill body displaying a connecting end, e.g. for fixing the twist drill in the chuck of a drilling machine, a middle part, and a working end with a center point, in addition to at least two main cutting edges that run roughly transversely to the longitudinal axis of the drill body and lie opposite one another in relation to the longitudinal axis, where the main cutting edges are each provided with a radially outer tip, which projects in the feed direction of the twist drill, a chip removal flute follows on from each main cutting edge, spiraling about the longitudinal axis of the drill body over at least a section of the middle part, the center point displays at least two pilot cutting edges, and the pilot cutting edges start from the free end of center point, run roughly transversely to the longitudinal axis of the drill body and lie opposite one another in relation to the longitudinal axis.

With known twist drills for wood, for example, when drilling through a workpiece, particularly one made of a relatively soft material, such as wood, plastic, soft metal and similar, and/or of layers, as in the case of a composite material or a laminated material, the problem arises that splintering, tearing, chipping or similar can occur at the edges of the drill holes, on both the entry side and the exit side, this often leading to destruction of the complete drill hole edges. These faults can be observed to a greater extent on workpieces made of pressed materials, such as pressboard, which display deformation anisotropy with layers arranged parallel to the pressed surface as a result of the pressing operation, and can thus break out or chip off more easily, composite materials and/or laminated materials. In addition, the high feed rates and pressures customary in industrial manufacturing promote the occurrence and extent of these flaws.

Progress can be achieved by the radially outer tips, which virtually score around the circumference of the drill hole and at least reduce splintering on the entry side. A twist drill of this kind is described in JP 02 237709 A (Patent Abstracts Of Japan, Vol. 014, No. 556 (M-1057), Dec. 11, 1990) and U.S. Pat. No. 4,529,341.

An attempt is made to further counteract this tendency to flaws by design-related measures in that tips of the main cutting edges are designed as outer pilot cutters with a circumferential cutting edge. These pilot cutters cut into the surface around the circumference of the drill hole on the entry side in order to prevent the wood fibers cut through at this point from being torn out radially outwards beyond this cut, as a result of which satisfactory absence of splinters in the area surrounding the drill hole can be achieved on the entry side.

Further progress is achieved in that the center point displays at least two pilot cutting edges, and the pilot cutting edges start from the free end of the center point, run roughly transversely to the longitudinal axis of the drill body and lie opposite one another in relation to the longitudinal axis, as disclosed in the two above-mentioned publications JP 02 237709 A and U.S. Pat. No. 4,529,341, as well as in EP 0 137 898 A1 and U.S. Pat. No. 5,288,183A. The material to be cut out can thus be cut away starting from the middle of the base of the drill hole. As a result, as soon as the center point enters, simultaneously centering the drill, a kind of pilot hole is sunk which, in accordance with the geometry of the center point, is smaller than that sunk by the main cutting edges.

However, splintering, tearing, chipping or similar can still easily occur on the drill hole edges on the exit side. To avoid this, inconvenient and complicated auxiliary measures are customarily applied, in that, for example, the workpiece is placed on a supporting surface for drilling, which generates counterpressure opposing the drilling thrust in the drill hole on the exit side, and into which the twist drill runs. In another customary auxiliary measure involving an additional work step, the drill hole is inconveniently and complicatedly sunk into the workpiece from both sides, meaning that the drill hole thus has two entry sides and no exit side.

The object of the invention is thus to provide a twist drill of the kind mentioned in the opening paragraph that, without additional auxiliary measures, permits through-drilling of a workpiece without the above-mentioned flaws occurring.

According to the invention, the object is solved in that the pilot cutting edges are each provided with a radially outer tip, projecting in the feed direction of the twist drill, and in that a pilot chip removal flute follows on from each pilot cutting edge, transitioning into the chip removal flute.

As a result of the radially outer tips of the pilot cutting edges, easier penetration of the pilot cutting edges into the material can be achieved, in that the tips of the pilot cutting edges cut off from the remaining material a chip that is to be cut off, is in the process of being cut off, or has already been cut by the pilot cutting edges, along a circumferential circle described by the tips during the drilling operation. Thus, no chip is generated whose width extends over the radius of the drill hole, but two chips can be cut off, one chip generated by the pilot cutting edge and cut off by the tips of the pilot cutting edges, and one chip generated by the main cutting edge, which can more easily be transported away from the base of the drill hole and out of the drill hole, since they each have a smaller volume than a customary chip. Depending on the size of the diameter of the twist drill, and on the nature of the material to be drilled, the tips can project a few tenths or more in the feed direction. The chips generated by the pilot cutting edges can be transported away from the pilot hole via the pilot chip removal flute and into the chip removal flute.

On a customary twist drill, the center point is, for functional reasons, located in front of the main cutting edges in the feed direction, such that the material to be cut away in the drill hole is only cut and transported away via the chip removal flute when reached by the main cutting edges. The result of this when using a customary twist drill is that the material in the between the center point and the main cutting edges is merely pushed forwards during feed movement, meaning that a high drilling thrust can build up. Just before a twist drill reaches the exit side, the remaining material wall between the exit side and the current base of the drill hole becomes so thin that the wall can break out at a certain thickness, depending on the drilling thrust acting on the wall and the material used for the workpiece. This effect can, for example, be more pronounced in pressed materials, composite materials and laminated materials, because of their above-mentioned layered structure, or in materials with a fibrous structure, such as wood or fiber-reinforced composites. The fibers can be cut by the radially outer tips of the pilot cutting edges, this making it possible to achieve a drill hole that is as splinter-free as possible. The drilling thrust can be reduced by the pilot cutting edges described in the opening paragraph. By generating individual chips cut off from the remaining chip by the radially outer tips, it is possible to achieve a further, decisive reduction in the drilling thrust. These chips can be transported away from the pilot hole through the pilot chip removal flute and into the chip removal flute. The drilling thrust built up by the main cutting edges is reduced accordingly, since it can be released into the pilot hole. Overall reduction of the drilling pressure makes it possible to avoid splintering, tearing, chipping and similar on both the entry side and the exit side of the drill hole.

Should minimal tearing and similar still occur as the center point passes through the exit side, this can be cleaned off when the main cutting edges follow.

Two main cutting edges and two pilot cutting edges are preferably provided, where the main cutting edges are offset at a rotational angle of 180° relative to one another, and the pilot cutting edges at a rotational angle of 180° relative to one another. Expressly included in the scope of the invention are also multiple-start drills, e.g. three-start drills, where the main and pilot cutting edges are distributed evenly over the rotational angle in accordance with their number, i.e. at a rotational angle of 120° in the case of a three-start drill. Moreover, left-hand or right-hand twist drills are included.

It is considered to be an advantage if, in a development of the working end, the pilot cutting edges are arranged in leading fashion at an offset rotational angle relative to the main cutting edges in the direction of rotation for drilling. As a result of this, the pilot cutting edges can cut into the material correspondingly sooner in the direction of rotation for drilling. The optimum size of the offset rotational angle is dependent on, among other things, the height of the center point or the distance of the free end of the center point from the radially outer tips of the main cutting edges, at which the main cutting edges begin to cut in the direction of rotation for drilling. The optimum height is determined by, among other things, the diameter of the twist drill or the diameter of the drill core, as well as by the material to be cut away. Given a correspondingly large distance, the offset rotational angle can possibly even take on negative values, meaning that the pilot cutting edges are arranged in trailing fashion relative to the main cutting edges in the direction of rotation for drilling. With a view to the dimensions of a customary twist drill, however, an offset rotational angle smaller than 40° is preferred. The pilot cutting edges and the main cutting edges of the twist drill according to the invention can display a trailing drill point surface or flank in the direction of rotation for drilling, where the flank of a main cutting edge intersects the flank of an adjacent pilot cutting edge. Avoiding a shoulder or similar between the flanks of a main cutting edge and an adjacent pilot cutting edge, the greatest possible length of the cutting edge of the pilot cutting edge is achieved, thus fully exploiting the projecting length of the center point relative to the main cutting edge. Furthermore, this results in the mechanical forces occurring in the pilot cutting edge being optimally transmitted via the flank of the main cutting edge into the working end. In terms of process engineering, this geometry is furthermore easier to produce by grinding-in on the working end.

The center point can have an angle of point of 60° to 180°, preferably of 70° to 100°, and particularly preferably of 75° to 95°. In this context, the optimum angle of point is dependent on, among other things, the diameter of the twist drill or the diameter of the core of the twist drill, which determines the diameter of the base of the center point. The larger the angle of point is, the longer the cutting edge of the pilot cutting edge can be.

The clearance angle, lip angle and rake angle of the pilot cutting edges can be adapted to the clearance angle, lip angle and rake angle of the main cutting edges.

The center point can expediently project beyond the tips of the pilot cutting edges and the tips of the main cutting edges in the feed direction, in this way guaranteeing accurate initial incision into the workpiece at the required point with the center point and the pilot cutting edges starting from the free end of the center point.

On the trailing side surface of the chip removal flute in the direction of rotation for drilling, the twist drill can run out into a known heel, which facilitates the guidance and the feed of the twist drill in the drill hole. In a development, the heel can, at the working end, moreover run out into a secondary cutting edge that further facilitates feed. Furthermore, the secondary cutting edges can smoothen the inner wall of the drill hole, this being capable of reducing the friction between the twist drill and the drill hole in favor of easier feed and less heat generation in the drill hole.

The tips of the pilot cutting edges can moreover be designed as inner pilot cutters, each of which has at least one circumferential cutting edge. The circumferential cutting edge is capable of achieving correspondingly circumferential incision into the workpiece surface. As a result, the material fibers and particles of the workpiece can be cut along this circumferential profile and more easily extracted from the material matrix, without this enabling further extraction of the material fibers beyond the circumferential profile. The inner pilot cutters can each also display two circumferential cutting edges, such that the material fibers can be cut around the circumference twice, and thus more completely, per rotating pilot cutter. The radially outer tips are generally located on the radially outer ends of the main cutting edges or the pilot cutting edges.

Provision can furthermore be made for the main cutting edges to extend radially inwards, under the circumferential radius on which the tips of the pilot cutting edges are located. This enlarges the total cutting edges of the drill, i.e. the cutting edges of the main cutting edges and of the pilot cutting edges, in that an area of radial overlap of the cutting edges is formed at the transition from the main cutting edge to the pilot cutting edge. For reasons of design, an undercut may occur in this context, the depth of which depends on, among other things, the offset rotational angle at which the main cutting edges and the adjacent pilot cutting edges are positioned in relation to one another.

The tips of the main cutting edges can be designed as outer pilot cutters with at least one circumferential cutting edge. As previously described in connection with the inner pilot cutters of the pilot cutting edges, the effect can occur in this context that the fibers of the material to be drilled are cut along a circle formed by the circumferential cutting edges, this preventing the fibers from being torn out in an outward direction beyond the profile of this cut.

In a development, the outer pilot cutters can be designed with one leading cutting edge and one trailing cutting edge, the two being located on the same radius. In terms of design, this can be achieved, for example, by the land, i.e. the surface of the wall between the chip removal flutes, being provided with a middle groove that runs out towards the working end of the twist drill, forming the leading and trailing cutting edges. In addition, this groove can achieve a reduction of the land with which the twist drill contacts the drill hole, and thus of the friction generated by the rotation of the twist drill. Moreover, this makes it possible to integrate two heels in the twist drill, one heel on the trailing side surface of the chip removal flute in the direction of rotation for drilling, and one on the leading side surface of the chip removal flute in the direction of rotation for drilling.

The section of the twist drill provided with the chip removal flute can display a known profile taper on the heel and the land that is directed radially inwards, starts at the working end and can continue up to the connecting end. This reduces the potential risk of wobbling or jamming of the twist drill in the drill hole.

The chip removal flutes can be arranged on the twist drill in clockwise or counterclockwise fashion. In this context, when simultaneously using two twist drills with one clockwise and one counterclockwise chip removal flute, for example, the opposite torques exerted on the workpiece by drilling can cancel each other out.

The design of the center point with the pilot cutting edges according to the invention can also be used on other customary twist drills with a center point, e.g. on an auger bit whose center point is, however, provided not with the customary draw-in thread, but with the pilot cutting edges, or on a Forstner auger bit.

The working end of the twist drill can additionally be provided with a carbide insert that forms at least the main cutting edges. Customary sintered carbides or similar are open to consideration as carbides for this purpose.

The drill body can be made of a customary twist drill material, such as chrome vanadium steel (CV steel) or a CV silver steel.

The invention is described in more detail below on the basis of a practical example and an associated drawing. The drawing shows the following:

FIG. 1 A side view of the twist drill according to the invention, which is designed as a twist drill for wood in this instance, FIG. 2 A side view of the working end, offset through a rotational angle of roughly 90° relative to the view shown in FIG. 1, and FIG. 3 A top view, on an enlarged scale, of the working end of the twist drill for wood in the direction of arrow III in FIG. 2.

FIGS. 1 to 3 show various views of a twist drill according to the invention, which is designed as twist drill for wood 1 in this practical example. FIG. 1 shows a side view of twist drill for wood 1. In this context, twist drill for wood 1 displays an elongated drill body 2 with a connecting end for fixing twist drill for wood 1, e.g. in a drilling machine not show here, a middle part 4, and a working end 5 with a center point 6. Center point 6 is provided with two main cutting edges 7 that run roughly transversely to the longitudinal axis of drill body 2 and lie opposite one another in relation to the longitudinal axis. As can be seen particularly clearly from FIG. 2, a side view of working end 5 of twist drill for wood 1 offset through a rotational angle of roughly 90° compared to FIG. 1, main cutting edges 7 are each provided with a radially outer tip 8. These tips 8 project in feed direction x of twist drill for wood 1. As can particularly be seen in FIG. 3, a top view of the working end in the direction of arrow III in FIG. 2, a chip removal flute 9 follows on from each main cutting edge 7, running across middle part 4 and spiraling about the longitudinal axis of drill body 2. Furthermore, the trailing side surface of chip removal flute 9 in direction of rotation for drilling d is designed as a heel 10 for guiding twist drill for wood 1 in the drill hole not shown here. Land 10 runs out into a secondary cutting edge 16 on working end 5.

Center point 6 displays two pilot cutting edges 11. Pilot cutting edges 11 start from the free end of center point 6, run roughly transversely to the longitudinal axis of drill body 2, and lie opposite one another relative to the longitudinal axis. As can particularly be seen from FIG. 3, a pilot chip removal flute 12 follows on from each pilot cutting edge 11, transitioning into chip removal flute 9.

On a conventional twist drill for wood, which displays a center point without incorporated pilot cutting edges, the material is only cut when the main cutting edges, which are located a distance away from the free end of the center point in the feed direction, penetrate the workpiece surface, meaning that the material to be removed in the area between the center point and the main cutting edge is merely pushed forwards and compressed during feed movement, this producing correspondingly high drilling thrust in the drill hole. In contrast, with the twist drill for wood according to the invention, as soon as center point 6 comes into contact with the workpiece to be drilled (not shown here), pilot cutting edges 11, starting from the free end of center point 6, begin to cut away the material to be drilled out, which is then transported away from center point 6, in the direction opposite to feed direction x, via pilot chip removal flute 12 and into chip removal flute 9. This achieves an initial reduction in the drilling thrust, which is built up by penetration of twist drill for wood 1 into the drill hole not shown here and is particularly responsible for the chipping, tearing, splintering, etc. of material on the exit side of the drill hole.

When main cutting edges 7, which follow on in feed direction x, cut into the workpiece not shown here, pilot cutting edges 11 have already sunk a corresponding pilot hole (not shown here), into which the drilling thrust built up by main cutting edges 7 can be released. Furthermore, depending on the precise design of the transition from pilot cutting edge 11 to main cutting edge 7, main cutting edges 7, which follow on from pilot cutting edges 11 in the radial direction, act directly on the outer radius of the pilot hole not shown here, such that, following on directly from the outer radius of the pilot hole, main cutting edges 7 cut away the material, which is transported away by chip removal flute 9, in the direction opposite to feed direction x. As a result, essentially no pressure build-up can arise due to material not cut off at the base of the drill hole. Should, however, small amounts of material not immediately cut off remain at the base of the drill hole, then being compressed by feed movement in feed direction x and thus inducing a correspondingly slight build-up of pressure at the base of the drill hole, this material can at least partly be pushed into the pilot hole sunk by the pilot cutting edges, and the drilling thrust relieved accordingly. The geometries of working end 5, with the radial transition from main cutting edge 7 to pilot cutting edge 11, can be decisive in this context and will be discussed in more detail below.

In the practical example presented here, center point 6 displays an angle of point p that, as can roughly be seen in FIG. 2, is approximately 80°. Needless to say, other angles of point are also conceivable, in a range from approx. 60° to approx. 140°, preferably from 70° to 100°, and particularly preferably from 75° to 95°. The size of the angle of point depends on, among other things, the height of center point 6 by which center point 6 projects beyond main cutting edges 7, as well as on the diameter of the core of twist drill for wood 1. For centering a drill hole, center point 6 projects beyond radially outer tips 8 of main cutting edges 7 and pilot cutting edges 11.

It can be seen from FIG. 3, a top view of working end 5 in the direction of arrow III in FIG. 2, that pilot cutting edges 11 are arranged in leading fashion at an offset rotational angle μ relative to main cutting edges 7 in direction of rotation for drilling d, where offset rotational angle μ is less than 40° in the practical example selected here. As a result, pilot cutting edge 11 cuts into the material correspondingly sooner in direction of rotation for drilling d. An optimum offset rotational angle μ depends on, among other things, the height of center point 6 relative to main cutting edges 7. In this context, material should already have been cut off by pilot cutting edge 11 and transported away via pilot chip removal flute 12 and chip removal flute 9, at least at the point where main cutting edge 7 penetrates the material to be drilled away during feed movement of twist drill for wood 1.

As can further be seen in FIG. 3, pilot cutting edges 11 and main cutting edges 7 each display a trailing drill point surface or flank 13 in direction of rotation for drilling d. In this context, flank 13 of a main cutting edge 7 runs up against flank 13 of the adjacent pilot cutting edge 11, forming an edge 14, without forming a shoulder or similar in between. As a result, the available height of center point 6, by which center point 6 projects beyond the inner radius of main cutting edge 7, is largely used to form pilot cutting edges 11.

As can be seen particularly clearly in FIG. 2, pilot cutting edges 11 are, similarly to main cutting edges 7, each provided with a radially outer tip 17, which projects in feed direction x of twist drill for wood 1, where radially outer tips 17 project only relatively slightly in the practical example presented here. It is conceivable for these tips to project farther than shown here.

As likewise not shown here in more detail, the tips of main cutting edges and/or pilot cutting edges can additionally be designed as pilot cutters, each with at least one circumferential cutting edge. In accordance with their radial position relative to the center point, the pilot cutters cut a circumferential circle into the material, such that tearing-out of fibers or similar of the material to be drilled away can be avoided beyond the circle.

The profile of the side view of the working end shown in FIG. 2 shows that a shoulder 15 is formed at the transition from pilot cutting edge 11 to main cutting edge 7, and that main cutting edge 7 follows on almost immediately from pilot cutting edge 11 in the radial direction. A conceivable possibility, but not realized in the practical example shown, is that the main cutting edge runs under pilot cutting edge 11, forming an undercut, as a result of which an area of overlap of main cutting edge 7 and pilot cutting edge 11 is produced, which makes it possible to achieve more exact and complete cutting-off of material in the transitional area.

As likewise not shown here, the pilot cutters of the main cutting edges can each be provided with one leading cutting edge and one trailing cutting edge in the direction of rotation for drilling, the two being located on the same radius. This makes it possible to achieve even sharper incision of the pilot cutting edges into the material. The leading and trailing cutting edges can be designed by providing a groove, not shown here, that spirals about the longitudinal axis of the drill body between the chip removal flutes and merges into the working end. As an additional effect, this reduces the friction surface with which the twist drill for wood laterally contacts the inner wall of the drill hole, thus enabling easier feed. Particularly on twist drills for wood with a relatively large diameter, the inner pilot cutters of the pilot cutting edges can also display a leading and a trailing cutting edge.

LIST OF REFERENCE NUMBERS

1 Twist drill for wood
2 Drill body
3 Connecting end
4 Middle part
5 Working end
6 Center point
7 Main cutting edge
8 Tip
9 Chip removal flute
10 Heel
11 Pilot cutting edge
12 Pilot chip removal flute
13 Flank
14 Edge
15 Shoulder
16 Secondary cutting edge
17 Tip
x Feed direction
d Direction of rotation for drilling
β Angle of point
μ Offset rotational angle

The invention claimed is:

1. Twist drill, with an elongated drill body displaying a connecting end, a middle part, and a working end with a center point, and at least two main cutting edges that run roughly transversely to the longitudinal axis of the drill body and lie opposite one another in relation to the longitudinal axis, wherein said main cutting edges are each provided with a radially outer tip which projects in the feed direction of the twist drill, and a chip removal flute that follows on from each main cutting edge, spiraling about the longitudinal axis of the drill body over at least a section of the middle part, wherein the center point displays at least two pilot cutting edges, the pilot cutting edges start from the free end of the center point, and run roughly transversely to the longitudinal axis of the drill body and lie opposite one another in relation to the longitudinal axis, wherein a pilot chip removal flute follows on from each pilot cutting edge, said pilot chip removal flute transitioning into the chip removal flute, and the pilot cutting edges are each provided with a radially outer tip, wherein the main cutting edges extend radially inwards, under the circumferential radius on which the tips of the pilot cutting edges are located.

2. Twist drill according to claim 1, wherein two main cutting edges and two pilot cutting edges are provided.

3. Twist drill according to claim 1, wherein the pilot cutting edges are arranged in leading fashion at an offset rotational angle relative to the main cutting edges in the direction of rotation for drilling.

4. Twist drill according to claim 3, wherein the offset rotational angle is smaller than 40°.

5. Twist drill according to claim 1 wherein the pilot cutting edges and the main cutting edges display a trailing drill point surface or flank in the direction of rotation for drilling, where the flank of a main cutting edge intersects the flank of an adjacent pilot cutting edge.

6. Twist drill according to claim 1, wherein the center point displays an angle of point of 60° to 140°.

7. Twist drill according to claim 6, wherein the angle of point is 70° to 100°.

8. Twist drill according to claim 6, wherein the angle of point is 75° to 95°.

9. Twist drill, with an elongated drill body displaying a connecting end, a middle part, and a working end with a center point, and at least two main cutting edges that run roughly transversely to the longitudinal axis of the drill body and lie opposite one another in relation to the longitudinal axis, wherein said main cutting edges are each provided with a radially outer tip which projects in the feed direction of the twist drill, and a chip removal flute that follows on from each main cutting edge, spiraling about the longitudinal axis of the drill body over at least a section of the middle part, wherein the center point displays at least two pilot cutting edges, the pilot cutting edges start from the free end of the center point, and run roughly transversely to the longitudinal axis of the drill body and lie opposite one another in relation to the longitudinal axis, wherein the pilot cutting edges are each provided with a radially outer tip, projecting in the feed direction of the twist drill, and in that a pilot chip removal flute follows on from each pilot cutting edge, said pilot chip removal flute transitioning into the chip removal flute.

10. Twist drill according to claim 1, wherein the tips of the pilot cutting edges are designed as inner pilot cutters, each of which has at least one circumferential cutting edge.

11. Twist drill, with an elongated drill body displaying a connecting end, a middle part, and a working end with a center point, and at least two main cutting edges that run roughly transversely to the longitudinal axis of the drill body and lie opposite one another in relation to the longitudinal axis, wherein said main cutting edges are each provided with a radially outer tip which projects in the feed direction of the twist drill, and a chip removal flute that follows on from each main cutting edge, spiraling about the longitudinal axis of the drill body over at least a section of the middle part, wherein the center point displays at least two pilot cutting edges, the pilot cutting edges start from the free end of the center point, and run roughly transversely to the longitudinal axis of the drill body and lie opposite one another in relation to the longitudinal axis, wherein a pilot chip removal flute follows on from each pilot cutting edge, said pilot chip removal flute transitioning into the chip removal flute, wherein the tips of the main cutting edges are designed as outer pilot cutters, each with at least one circumferential cutting edge wherein the outer pilot cutters are designed with one leading cutting edge and one trailing cutting edge in the direction of rotation for drilling, the two being located on the same radius.

12. Twist drill according to claim 1, wherein the tips of the main cutting edges are designed as outer pilot cutters, each with at least one circumferential cutting edge.

13. Twist drill according to claim 12 wherein the outer pilot cutters are designed with one leading cutting edge and one trailing cutting edge in the direction of rotation for drilling, the two being located on the same radius.

14. Twist drill according to claim 1, wherein the trailing side surface of the chip removal flute in the direction of rotation for drilling runs out into a heel.

* * * * *